United States Patent [19]

Simon et al.

[11] Patent Number: 4,550,944
[45] Date of Patent: Nov. 5, 1985

[54] RETAINER FOR RADIO RECEIVER

[75] Inventors: Frederick A. Simon, Ann Arbor; Thomas H. Forcey, Dearborn, both of Mich.

[73] Assignee: Ford Motor Company, Dearborn, Mich.

[21] Appl. No.: 585,684

[22] Filed: Mar. 2, 1984

[51] Int. Cl.<sup>4</sup> ............................................. B60K 35/00
[52] U.S. Cl. ..................................... 296/70; 248/27.3; 248/DIG. 6; 312/242
[58] Field of Search ............... 248/27.3, 27.1, DIG. 6; 180/90; 296/70; 312/242

[56] References Cited

U.S. PATENT DOCUMENTS

| 2,800,698 | 7/1957 | Wood | 248/27.3 |
| 3,989,343 | 11/1976 | Luius et al. | 248/27.3 |
| 4,063,660 | 12/1977 | Ware | 248/27.3 |
| 4,462,564 | 7/1984 | Alves et al. | 248/27.1 |

FOREIGN PATENT DOCUMENTS 2032363  5/1980  United Kingdom ................. 296/70

Primary Examiner—Robert R. Song
Attorney, Agent, or Firm—Clifford L. Sadler; Daniel M. Stock

[57] ABSTRACT

A retainer for an automobile radio receiver consists of a unitary spring clip member having an inclined abutting surface for mounting engagement with the automobile instrument panel and a release and locking portion for cooperation with a hand tool to release spring load and lockingly engage the tool for removal of the receiver.

6 Claims, 3 Drawing Figures

4,550,944

RETAINER FOR RADIO RECEIVER

BACKGROUND OF THE INVENTION

In the manufacture of automobiles having factory installed radio receivers, installation and removal of such receivers has been a labor intensive and expensive operation. In general, an aperture is formed in the instrument panel of the automobile and the radio receiver is inserted into the aperture and fastened to the intrument panel through a plurality of fasteners which are generally located in positions not visible to the vehicle occupants. More recently, radio receivers have been equipped with spring clips which engage the instrument panel upon insertion but which require intricate and laborious manual operations for release and removal.

SUMMARY OF THE INVENTION

Responsive to the deficiencies in the known prior art retention systems for radio receivers, the present invention provides a retention system in which a uniquely formed clip spring is employed as the primary fastening means. The clip spring is formed to provide an assembled load between the radio and the instrument panel aperture upon insertion and to provide positive retention of the radio receiver within the instrument panel aperture. The retainer of the present invention further provides a locking portion that is directly cooperative with certain knobbed removal tools to allow insertion of the tool from outside the instrument panel to a locking engagement position in which the clip spring retention is rendered inoperative and the radio receiver may be withdrawn from the instrument panel aperture. The retainer is formed to include an angled abutting surface to make it inherently tolerant of manufacturing variances in instrument panel thickness which contributes to the economy of manufacture and the design of the locking portion adds a removal function to the retainer.

BRIEF DESCRIPTION OF THE DRAWINGS

The foregoing and other features and advantages of the present invention will become apparent to those skilled in the art upon reading the following detailed description of a preferred embodiment with reference to the accompanying drawings, in which.

DESCRIPTION OF THE PREFERRED EMBODIMENT

Figure 1:
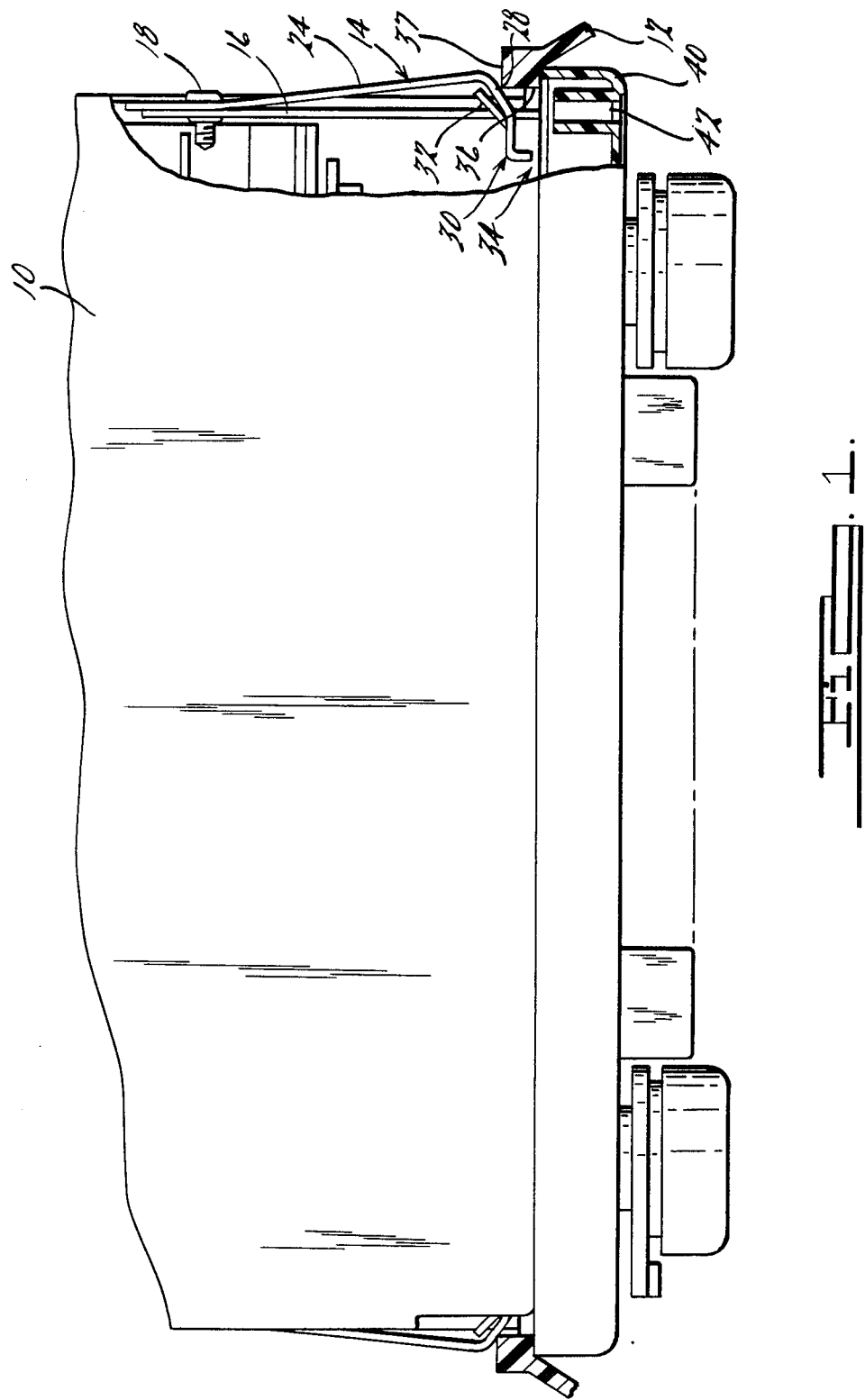
FIG. 1 is a top view of a radio receiver instaled in the vehicle instrument panel and employing the retainer of the present invention partially sectioned for clarity.

Turning now to the drawings and, in particular, to FIG. 1 thereof, a known automobile radio receiver 10 is illustrated in the position in which it is installed in the instrument panel 12 of the vehicle. The receiver 10 is secured against outward (downward as viewed in FIG. 1) removal from the instrument panel 12 by the retainer 14 of the present invention. The retainer 14 is secured to a wall 16 of the radio receiver 10 through a conventional fastener such as the screw shown at 18.

The retainer 14 of the present invention is illustrated in the drawings as consisting of a unitary clip spring member advantageously formed as by appropriate stamping operations to perform the locking and removal functions desired. The retainer 14 includes a flat mounting portion 20 through which the screw 18 is driven for fixing the retainer 14 to the radio receiver 10. A struck-up slot 22 is preferably formed in the wall 16 of the radio receiver 10 to receive the free end of the flat fastening portion 20 of the retainer 14 thereby securing the retainer 14 against rotation about the axis of the fastener 18.

Figure 2:
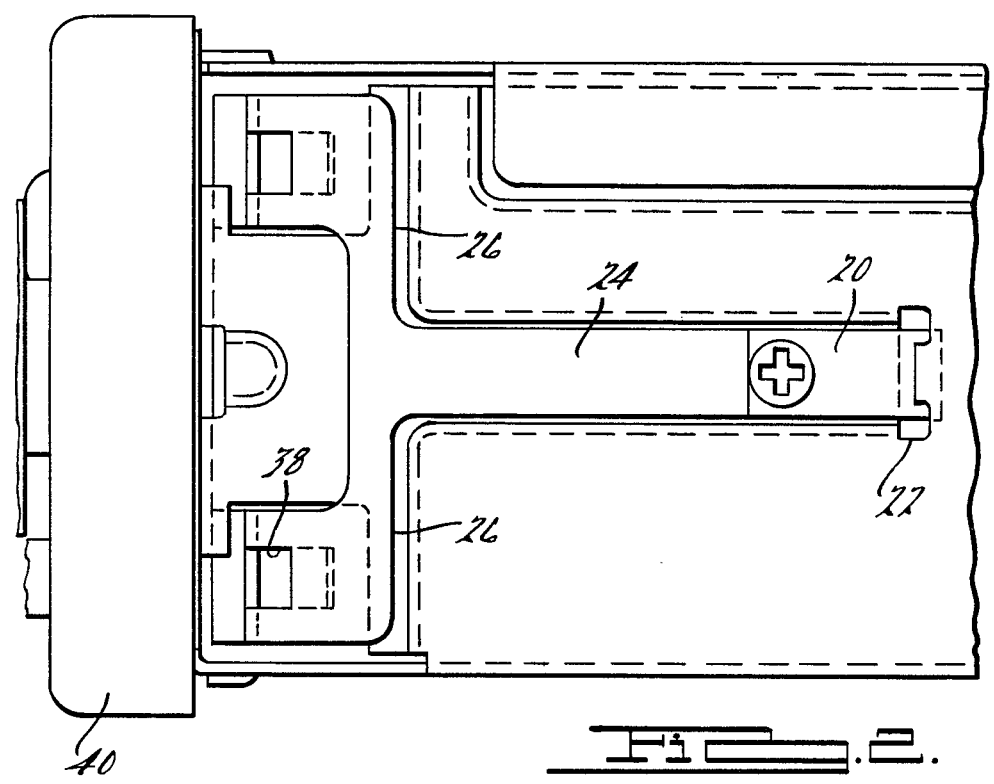
FIG. 2 is a partial side view of the radio receiver of FIG. 1 showing the retainer of the present invention installed.

Extending outwardly from the wall 16 of the radio at the other end of the flat mounting portion 20 is a spring arm portion 24 which terminates in a pair of legs 26 as may best be seen in FIG. 2. Each of the legs 26 includes an inward turned abutting portion 28 extending from the outer terminus of the spring arm portion 24. Each leg 26 further includes a more inwardly bent locking portion 30 from which is struck an inwardly canted tab 32.

Secure assembly of the radio receiver 10 into the instrument panel 12 is effected by insertion of the radio receiver 10 into a suitably sized aperture 34 formed in the instrument panel 12. As the radio receiver 10 is inserted inwardly (upwardly as viewed in FIG. 1), the spring arm portion 24 of the retainer 14 engages inner wall 36 of the aperture 34 and is compressed inwardly to permit passage of the radio receiver 10. When the spring arm portion 24 clears the thickness of the instrument panel 12, the abutting portion 28 of the retainer 14 slides across the corner of the back wall 37 of the instrument panel 12 to an abutting locking position as is shown in FIG. 1. The canted or angled configuration of the abutting portion 28 makes the retainer 14 inherently tolerant of manufacturing variances in aperture width and instrument panel thickness. It will be appreciated by those skilled in the art that clearance slots or holes in the wall 16 of the radio receiver 10 will be provided to prevent interference of the inner end of the retainer 14 when in its compressed state during insertion.

When the radio receiver 10 is in the abutting locked position shown in FIG. 1, further insertion is prevented by cooperation of the outer surface of the radio face plate 40 with the instrument panel 12. When so positioned, the locking portions 30 of the retainer 14, and specifically the tabs 32, are in axial registration with apertures 42 formed through the face plate 40.

Figure 3:
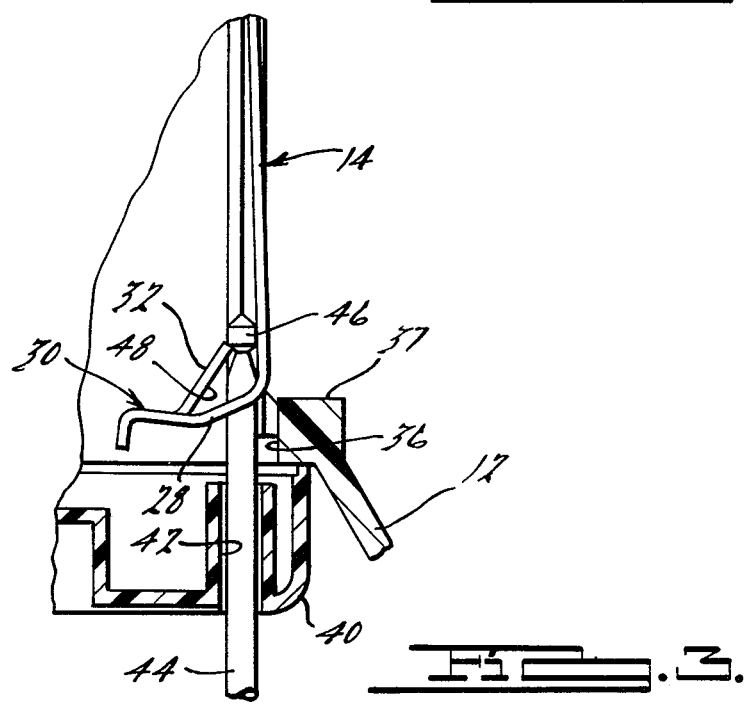
FIG. 3 is an enlarged cross-section view of the outboard end of the retainer of the present invention showing engagement with a knobbed removal tool.

Apertures 42 are formed in the slate 40 provide access to the retainer 14 for facilitating removal of the radio receiver 10 from the instrument panel 12. This is accomplished through use of a special tool 44 which includes a knob portion 46 which upon first insertion engages a ramp portion 48 of the tab 32 of retainer locking portion 30. Tools of this type are known in the automotive industry and have been used in cooperation with other radio retaining clips. Insertion of the tool 44 which may, in fact, be a forked device permitting insertion into upper and lower apertures 42, simultaneously causes sliding movement of the tab 32 with respect to the tool 44. The tool 44 is constrained for axial movement within the aperture 42. This axial movement therefore draws the spring arm portion 24 inward to clear the wall 36 of instrument panel aperture 34. Complete insertion of the tool 44 through radio face aperture 42 and tab aperture 38 achieves the position shown in FIG. 3 in which the undersurface of the knob portion 46 of tool 44 is trapped by the free end of the tab 32 and withdrawal of the tool 44 effects withdrawal of the radio receiver 10 from the instrument panel 12.

While only one embodiment of the present invention has been described herein, others may be possible without departing from the scope of the appended claims.

What is claimed is:

1. A retainer system for securing a radio receiver in an automobile instrument panel having a generally rectangular aperture formed therethrough and for permitting withdrawing of the receiver from the aperture through engagement with a hand tool, the retainer system comprising:
   A. means defining a plurality of access apertures sized to receive the hand tool through the instrument panel adjacent the lateral edges of the aperture; and
   B. a plurality of unitary clip spring members, each including:
      (1) a flat mounting portion secured to a side surface of the receiver;
      (2) a spring arm portion bent outwardly from the fastening portion to define a normal position extending from the receiver beyond the width of the aperture and being compressible to allow insertion through the aperture; and
      (3) a panel abutting portion canted generally inwardly from the free end of the spring arm portion in registration with the access apertures to define an angled surface for abuttingly engaging the inner terminus of the aperture upon certain insertion of the receiver thereinto to a retaining position to prevent removal of the receiver.

2. A retainer system as defined in claim 1, wherein said clip spring members further include:
   A. a further inwardly canted locking portion having means for lockingly engaging a knobbed tool upon the insertion of the tool axially through the access apertures.

3. A retainer system as defined in claim 2, wherein the locking portion includes an aperture alignable with the access aperture when the abutting portion engages the instrument panel aperture terminus in the retaining position and an inclined tab on the side of the locking portion aperture proximate the receiver to permit inward deflection of the spring arm portion to positions permitting removal of the receiver through the aperture upon insertion of the hand tool to positions engaging the tab and to lockingly engage the hand tool upon certain inward insertion thereof through the access aperture.

4. A retainer system as defined in claim 1, wherein the clip spring members further include means defining a ramp surface in axial registration with the access apertures whereby the imposition of force directed axially through the access apertures deflects the spring arm portion inwardly to positions not abutting the instrument panel aperture.

5. A retainer member for selectively securing a radio receiver in an aperture in an automobile instrument panel, the retainer member comprising a unitary spring clip member adapted to be secured to an outside surface of the radio receiver and including a spring arm portion extending outwardly from the radio surface, and an abutting portion extending generally inwardly from an end of the spring arm portion and including an inclined abutting surface for engaging a portion of the instrument panel bounding the aperture, the further including release means extending further inwardly from the abutting portion and operative in response to the imposition of a load thereon in a plane parallel to the plane of attachment to the radio receiver to compress the spring arm portion inwardly to permit movement of the radio receiver through the aperture.

6. A retainer member as defined in claim 5, wherein the unitary clip member is of generally T-shaped profile and the abutting portion includes a pair of spaced arms each engaging a portion of the instrument panel aperture.

* * * * *